United States Patent
Srikantiah et al.

(10) Patent No.: US 8,362,953 B2
(45) Date of Patent: Jan. 29, 2013

(54) SEQUENTIAL CHIP CORRELATION ARRAY

(75) Inventors: Murali Krishna Srikantiah, Bangalore (IN); Vimala Chikkabbaiah, Bangalore (IN); Gowdayyanadoddi Shivaiah Naveen, Bangalore (IN)

(73) Assignee: Accord Software and Systems Pvt Ltd, Bangalore (IN)

( * ) Notice: Subject to any disclaimer, the term of this patent is extended or adjusted under 35 U.S.C. 154(b) by 131 days.

(21) Appl. No.: 12/753,912

(22) Filed: Apr. 5, 2010

(65) Prior Publication Data

US 2011/0241938 A1 Oct. 6, 2011

(51) Int. Cl.
*G01S 19/37* (2010.01)
*G01S 19/29* (2010.01)
*G01S 19/30* (2010.01)
(52) U.S. Cl. .......... 342/357.77; 342/357.68; 342/357.69
(58) Field of Classification Search .............. 342/357.75, 342/357.77, 357.67, 357.68, 357.69, 357.72, 342/357.73
See application file for complete search history.

(56) References Cited

U.S. PATENT DOCUMENTS

| 6,208,291 B1 | 3/2001 | Krasner |
| 7,428,259 B2 | 9/2008 | Wang et al. |
| 2002/0015439 A1 | 2/2002 | Kohli et al. |

FOREIGN PATENT DOCUMENTS

WO    WO 2008138891 A2 * 11/2008

* cited by examiner

*Primary Examiner* — Cassie Galt
(74) *Attorney, Agent, or Firm* — Ash Tankha; Lipton, Weinberger & Husick (57) ABSTRACT

An arrangement of M signal generators in a global navigation satellite signal baseband chip for obtaining a sequential chip correlation array is provided. The sequential chip correlation array generates M×N code bit sequences, M in-phase and M quadrature-phase carrier mixed signals. The M signal generators are arranged consecutively. A programmable parameter is created for providing a spacing of $T_C$ between each N code bit sequences. A first carrier and code generator is provided within each signal generator for generating an in-phase and a quadrature-phase component of a first carrier signal, and N code bit sequences. The first carrier and code generators within adjacently arranged signal generators are programmed with same code chip offset, different carrier signal frequency, different code frequency, and different code phase offset. M in-phase and M quadrature-phase carrier mixed signals, and N code bit sequences are generated by the M signal generators based on the programmable parameter.

8 Claims, 7 Drawing Sheets

| CODE OFFSET | CARRIER OFFSET (Hz) | LOSS (dB) | PEAK |
|---|---|---|---|
| 0 | 0 | 0 | 0 |
|  | 1/T | 0 | 1/T |
|  | 1/(2T) | 4 | 0, 1/(T) |
| 0.25 | 0 | 3 | 0 |
|  | 1/T | 3 | 1/T |
|  | 1/(2T) | 7 | 0, 1/(T) |
| 0.5 | 0 | 6 | 0 |
|  | 1/T | 0 | 1/T |
|  | 1/(2T) | 4 | 0, 1/(T) |
| 1 | 0 | 0 | 0 |
|  | 1/T | 0 | 1/T |
|  | 1/(2T) | 4 | 0, 1/T |

SEQUENTIAL CHIP CORRELATION ARRAY

BACKGROUND

Wireless assisted global navigation satellite systems (GNSS) with emerging enhanced 911 (E911) compliance standards require reduced acquisition time in GNSS reception. A user's location information needs to be accurately communicated in the shortest possible time to emergency support providers. If the location data is not accurate, emergency dispatchers may experience difficulty in routing 911 calls to the appropriate center. Mobile phones also need to be operable indoors and in urban canyons. Typical GNSS systems also need to have the capability to handle weak signals and respond with both speed and location accuracy. For example, E911 compliance requires that the object be identified within 125 meters and within a 5 second span in most instances.

The conventional method to acquire satellite signal is through the use of multiple hardware blocks. Time to first fix (TTFF) performance is dependent on the correlation acquisition process. For example, incoming GNSS signals from twelve respective satellites are channeled to twelve hardware blocks partitioned in a correlator. The twelve hardware blocks then perform the correlation exercise in parallel. The above conventional approach faces significant challenges such as high time to first fix and where a larger number of correlators are provided, the conventional approach increases the size of the correlator device and hence the overall silicon real estate of a receiver in a GNSS system. There is a strong industry move towards GNSS integration in automotive and hand-held applications. These applications demand the GNSS system have a small form factor. For achieving low TTFF, GNSS systems require a very large number of correlators to simultaneously search the code shifts and frequency bins to acquire the satellite signal. The area and power numbers increase drastically with the number of acquisition correlators. This poses a great challenge for hand-held GNSS applications.

Therefore, there is a long felt but unresolved need to provide an implementation of a GNSS receiver that achieves reduced TTFF without a significant increase in gate count of the hardware.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The global navigation satellite system (GNSS) baseband chip disclosed herein addresses the above stated need to provide an implementation of a GNSS receiver that achieves reduced TTFF without significant increase in gate count of the hardware. The GNSS baseband chip disclosed herein simultaneously searches code shifts and frequency bins to acquire a satellite signal. The GNSS baseband chip also achieves a significant reduction in hardware for acquiring one or more satellite signals. Apart from reducing the hardware for acquiring one or more satellite signals, the GNSS baseband chip also comprises a phase computation logic circuit for reducing interrupt rate to an external baseband processor and thereby reduces overall power consumption required to acquire and track one or more satellite signals.

The GNSS baseband chip disclosed herein comprises a satellite signal acquisition module for acquiring a received first satellite signal used for global navigation. The GNSS baseband chip is programmable for acquiring a particular satellite signal from multiple satellite signals used for global navigation. The GNSS baseband chip acquires the received satellite signal, if the received satellite signal is same as the satellite signal programmed for acquisition. The satellite signal acquisition module comprises a sequential chip correlation array comprising M signal generators, where M is a positive integer. Each of the M signal generators comprises a first carrier and code generator for generating an in-phase component of a first carrier signal, a quadrature-phase component of the first carrier signal, and N code bit sequences, where N is a positive integer. A code bit sequence is a pseudo random noise (PRN) code sequence of +1's and −1's. The first carrier and code generator generates the in-phase component of the first carrier signal and the quadrature-phase component of the first carrier signal with a programmed frequency. Furthermore, the first carrier and code generator generates the N code bit sequences with a programmed code phase offset, a programmed code frequency, and a programmed code chip offset.

Each of the M signal generators further comprises an accumulator for accumulating an in-phase carrier mixed signal and a quadrature-phase carrier mixed signal. The in-phase carrier mixed signal is obtained by multiplying the in-phase component of the first carrier signal with down-converted and sampled received first satellite signal. The quadrature-phase carrier mixed signal is obtained by multiplying the quadrature-phase component of the first carrier signal with down-converted and sampled received first satellite signal. The arrangement of the M signal generators within the sequential chip correlation array provides a time to first fix (TTFF) with half the hardware as required by conventional massive correlators.

The satellite signal acquisition module further comprises a selective signal selector. The selective signal selector is programmable for selecting the accumulated in-phase carrier mixed signal, the accumulated quadrature-phase carrier mixed signal, and the N code bit sequences from one of the M signal generators. The satellite signal acquisition module further comprises a sequential code mixer. The sequential code mixer comprises N multipliers. The N multipliers perform simultaneous multiplication of the selected N code sequences with the selected in-phase carrier mixed signal and the selected N code sequences with the selected quadrature-phase carrier mixed signal. The sequential code mixer also comprises N accumulators for accumulating N in-phase code mixed signals and N quadrature-phase code mixed signals. The sequential code mixer is sequentially shared across the M signal generators.

The satellite signal acquisition module further comprises a post correlation accumulator for performing programmable coherent integration and programmable non-coherent integration of M×N in-phase code mixed signals and M×N quadrature-phase code mixed signals for obtaining M×N non-coherent integration values. The M×N in-phase code mixed signals and M×N quadrature-phase code mixed signals are referred to as correlation values. The baseband processor also aligns the beginning of the coherent integration with data boundary prior to the coherent integration. The satellite signal acquisition module also comprises a peak detector for detecting the peak among M×N non-coherent integration values. The sampled received first satellite signal is acquired based on the detected peak and if the received first satellite signal is the same as the programmed satellite signal. The satellite signal acquisition module is sequentially processed at a rate of $P \times f_S$ for acquiring P satellite signals, where P is any positive integer and $f_S$ is sampling frequency used for sampling the down converted first satellite signal.

The GNSS baseband chip further comprises a tracking module for tracking a second satellite signal. The second satellite signal can either be the first satellite signal acquired by the satellite signal acquisition module, or a satellite signal specifically programmed for tracking. The tracking module comprises a second carrier and code generator for generating an in-phase component of a second carrier signal, a quadrature-phase component of the second carrier signal, and a code sequence corresponding to the second satellite signal.

The tracking module further comprises a carrier and code mixer, a coherent integrator, and a non-coherent integrator. The coherent integrator generates coherent integration data of carrier and code mixed in-phase component and carrier and code mixed quadrature-phase component. The non-coherent integrator generates envelope data from the coherent integration data. The tracking module further comprises a data boundary synchronizer for generating data boundary detection data using the coherent integration data from the tracking module. The data boundary synchronizer transfers the generated data boundary detection data to a baseband processor for further processing. The baseband processor controls the tracking module using the coherent integration data and the envelope data. The baseband processor also aligns the beginning of the coherent integration with the data boundary prior to the coherent integration of the carrier and code mixed in-phase component and the carrier and code mixed quadrature-phase component.

The GNSS baseband chip further comprises a phase computation logic circuit for enabling a low interrupt rate to the baseband processor. The phase computation logic circuit, for example, enables sending of the correlation values, code phase offset, the code frequency, the code chip offset, and data boundary detection data at reduced interrupt rate. The phase computation logic circuit computes arc tangent phase values from one or more coherent integration data and sends the arc tangent phase values to the baseband processor at a low interrupt rate. The computed arc tangent phase values are further processed by the baseband processor. The tracking module is processed at a rate of $Q \times f_S$ for tracking Q satellite signals.

Also, disclosed herein is a method of arranging the M signal generators in a GNSS baseband chip for generating M×N code bit sequences, M in-phase carrier mixed signals, and M quadrature-phase carrier mixed signals. The method disclosed herein comprises a) arranging the M signal generators consecutively, wherein M and N are positive integers; b) providing a spacing of $T_C$ between each of the N code bit sequences, where $T_C$ is the width of a single code chip; c) providing within each of the M signal generators a first carrier and code generator for generating an in-phase component of a first carrier signal, a quadrature-phase component of the first carrier signal, and the N code bit sequences; d) programming a first carrier and code generator of an $A^{th}$ signal generator and a first carrier and code generator of an $(A+1)^{th}$ signal generator of the M signal generators with same code chip offset, different carrier signal frequency, different code frequency, and different code phase offset, wherein A is a positive integer and A<M; e) generating the N code bit sequences by each of the M signal generators based on the programmable parameter, wherein the N code bit sequences are obtained by incrementally shifting a locally generated code sequence by $T_C$; and f) generating the M in-phase carrier mixed signals and the M quadrature-phase carrier mixed signals by mixing the in-phase component of the carrier signal and the quadrature phase component of the carrier signal with down converted and sampled incoming satellite signal in each of the M signal generators.

Furthermore, disclosed herein is a method of sharing a sequential code mixer comprising N multipliers and N accumulators sequentially across M signal generators, comprising: a) accumulating and storing carrier mixed signals over a period of code clock ($T_C$) within each of the M signal generators, wherein the carrier mixed signals comprise a down converted and sampled first satellite signal multiplied with an in-phase component of a first carrier signal and the down converted and sampled satellite signal multiplied with a quadrature-phase component of the carrier signal, wherein M and N are positive integers; b) storing N code bit sequences within each of the M signal generators; c) storing the accumulated carrier mixed signals and the N code bit sequences for B clock periods, where $B > M/(f_S/f_C)$, wherein $f_S$ is frequency of sampling of down converted and sampled satellite signal and $f_C$ is frequency of code bit sequence generated within the M signal generators; d) sharing the sequential code mixer across the M signal generators sequentially, comprising: e) code mixing the accumulated in-phase carrier mixed signal and the quadrature phase carrier mixed signal with the N code bit sequences for obtaining N in-phase code mixed signals and N quadrature-phase code mixed signals; f) accumulating the N in-phase code mixed signals and the N quadrature-phase code mixed signals separately in the N accumulators for a predefined time period; and g) performing coherent and non-coherent integration of the accumulated N in-phase code mixed signals and the N quadrature-phase code mixed signals.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
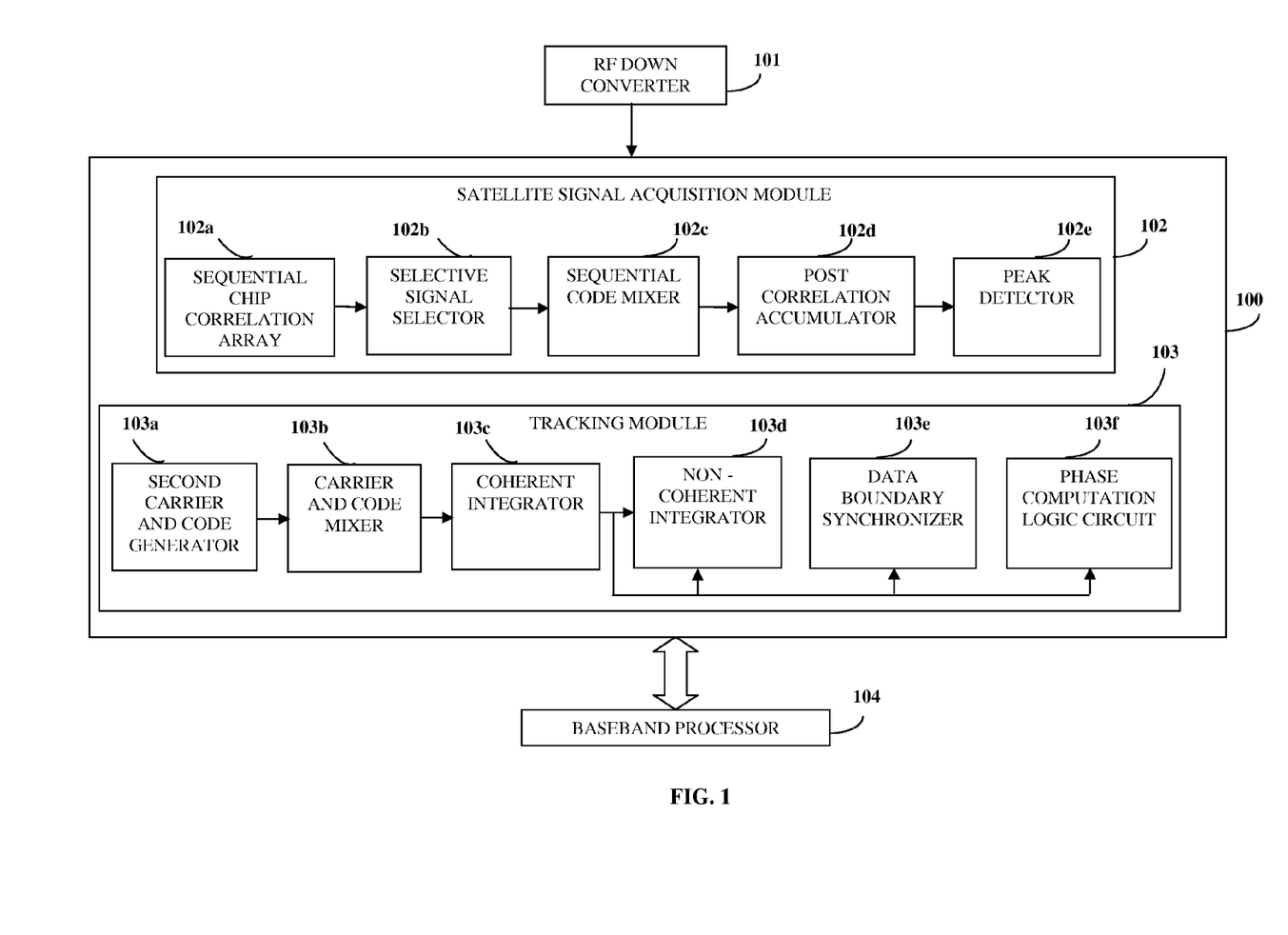
FIG. 1 illustrates a global navigation satellite system (GNSS) baseband chip for acquiring multiple satellite signals and tracking multiple satellite signals.

FIG. 1 illustrates a global navigation satellite system (GNSS) baseband chip 100 for acquiring a global navigation satellite system. A global navigation satellite system is, for example, a global positioning system (GPS) signal comprising ranging signals, used to measure the distance to the satellite, and navigation messages. The navigation messages include data used to calculate the position of the satellite in orbit, and information about time and status of the entire satellite constellation. It should be evident; however, that global navigation satellite system is, for example, associated with other satellite positioning systems, such as the Russian "Glonass" system and the European "Galileo" system. Each GNSS satellite broadcasts a global navigation satellite signal having message data and signal structure that is unique to that satellite, thereby enabling a GNSS receiver to distinguish the global navigation satellite signal from one GNSS satellite to another GNSS satellite.

The GNSS baseband chip 100 disclosed herein comprises a satellite signal acquisition module 102 for acquiring a first satellite signal used for global navigation. The GNSS baseband chip 100 is programmable for acquiring a particular satellite signal out of multiple satellite signals used for global navigation. The GNSS baseband chip 100 receives a satellite signal and acquires the received satellite signal, if the received satellite signal is same as the satellite signal programmed for acquisition. The received satellite signal is at a frequency of 1575.42 MHz. The received satellite signal is down-converted using a radio frequency (RF) down converter 101. The RF down converter 101 brings down the satellite signal frequency from 1575.42 MHz to an intermediate frequency (IF) of $f_{IF}$ MHz. The RF down converter 101 is, for example, an off chip integrated circuit (IC). The intermediate frequency signal is sampled at a rate of $f_S$ MHz using an analog-to-digital converter (ADC) (not shown). The ADC is for example, a part of the RF down converter 101.

Figure 2:
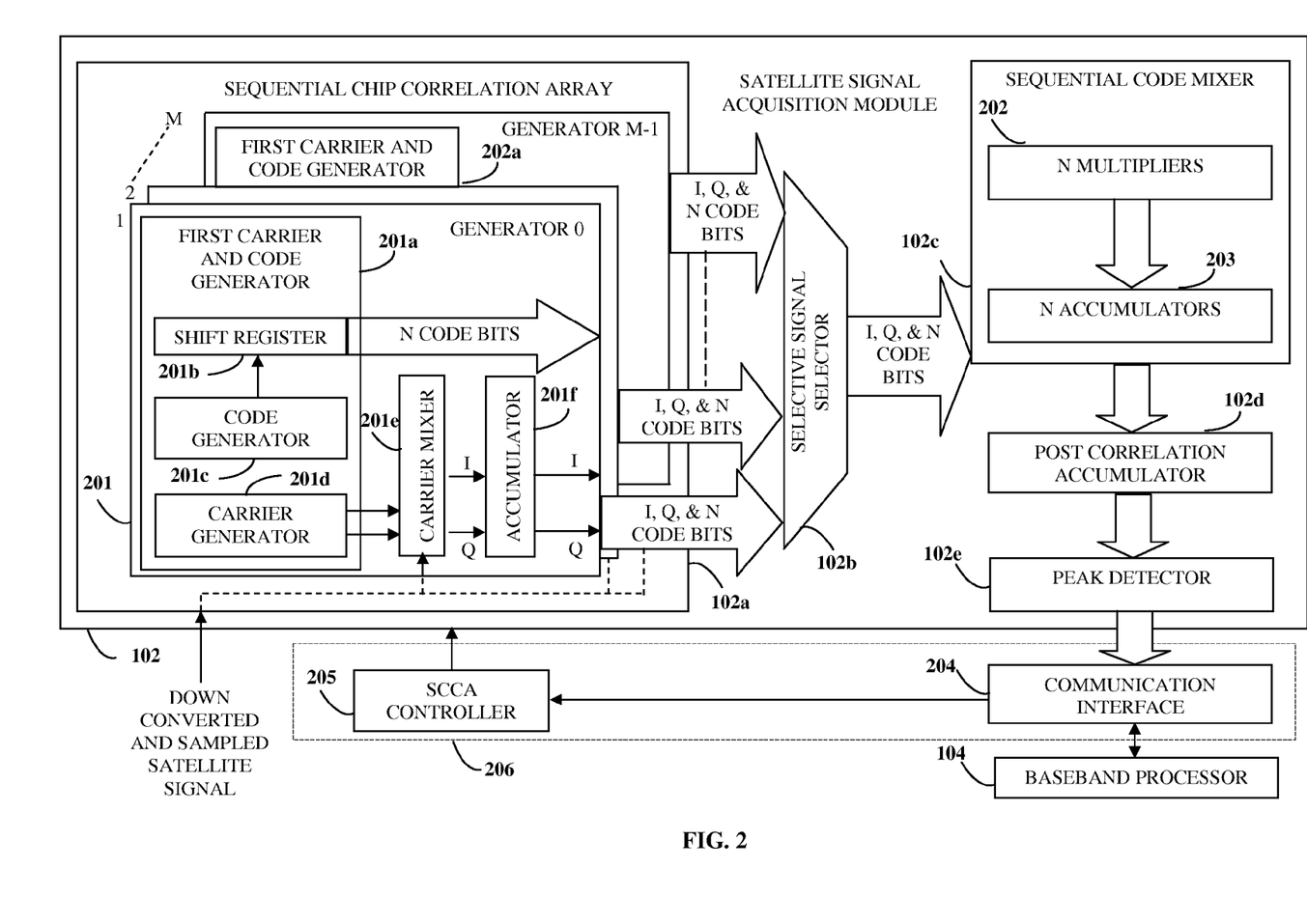
FIG. 2 illustrates a satellite signal acquisition module.

The satellite signal acquisition module 102 comprises a sequential chip correlation array 102a comprising M signal generators 201, as illustrated in FIG. 2. Each of the M signal generators 201 comprises a first carrier and code generator 201a for generating an in-phase component of a first carrier signal (I), a quadrature-phase component of the first carrier signal (Q), and N code bit sequences, where M and N are positive integers. A carrier signal is, for example, an oscillating signal suitable for modulation by an information bearing signal, such as the first satellite signal. The in-phase component of the carrier signal is a component that is in-phase with the carrier signal and the quadrature-phase component of the carrier signal is a component that is 90° out of phase with the carrier signal. A code bit sequence is a pseudo random noise (PRN) code sequence of +1's and −1's. Each global navigation satellite transmits a satellite signal comprising a unique code bit sequence. The code bit sequence uniquely identifies the satellite transmitting the signal. The first carrier and code generator 201a generates the in-phase component of the first carrier signal and the quadrature-phase component of the first carrier signal with a programmed frequency using a carrier generator 201d. The first carrier and code generator 201a also generates the N code bit sequences with a programmed code phase offset, a programmed code frequency, and a programmed code chip offset. The first carrier and code generator 201a comprises a code generator 201c for generating a code bit sequence corresponding to the satellite signal programmed for acquisition. The first carrier and code generator 201a receives the code phase offset, the code frequency, and the code chip offset from a baseband processor 104. The first carrier and code generator 201a programs the code generator 201c to generate the code bit sequence with the received code phase offset, received code frequency, and received code chip offset. The first carrier and code generator 201a programs the carrier generator 201d to generate the in-phase component of the carrier signal and the quadrature-phase component of the carrier signal with the received carrier frequency.

Each of the M signal generators 201 further comprises an accumulator 201f for accumulating an in-phase carrier mixed signal and a quadrature-phase carrier mixed signal. An accumulator is an electronic register used for storing intermediate results. The accumulator 201f disclosed herein is used for accumulating the in-phase carrier mixed signal and the quadrature-phase carrier mixed signal. The in-phase carrier mixed signal is obtained by multiplying the in-phase component of the first carrier signal with down-converted and sampled received first satellite signal using the carrier mixer 201e. The quadrature-phase carrier mixed signal is obtained by multiplying the quadrature-phase component of the first carrier signal with down-converted and sampled received first satellite signal using the carrier mixer 201e. The arrangement of the M signal generators 201 within the sequential chip correlation array 102a provides a time to first fix (TTFF) with half the hardware as required by conventional massive correlators.

The satellite signal acquisition module 102 further comprises a selective signal selector 102b. The selective signal selector 102b is for example a multiplexer. The selective signal selector 102b is programmable for selecting the accumulated in-phase carrier mixed signal, the accumulated quadrature-phase carrier mixed signal, and the N code bit sequences from one of the M signal generators 201. The satellite signal acquisition module 102 further comprises a sequential code mixer 102c. The sequential code mixer 102c comprises N multipliers 202. The N multipliers 202 perform simultaneous multiplication of the selective signal selector 102b selected N code sequences with the selected in-phase carrier mixed signal and the selected N code sequences with the selected quadrature-phase carrier mixed signal. Multiplication of a code sequence with an in-phase carrier mixed signal or a quadrature-phase carrier mixed signal is called code mixing. N in-phase code mixed signals and N quadrature-phase code mixed signals are obtained as a result of the above code mixing. The sequential code mixer 102c also comprises N accumulators 203 for accumulating the N in-phase code mixed signals and the N quadrature-phase code mixed signals. The sequential code mixer 102c is sequentially shared across the M signal generators 201.

The satellite signal acquisition module 102 further comprises a post correlation accumulator 102d for performing programmable coherent integration and programmable non-coherent integration of M×N in-phase code mixed signals and M×N quadrature-phase code mixed signals for obtaining M×N non-coherent integration values. Programmable coherent integration involves accumulating the M×N in-phase code mixed signals and M×N quadrature-phase code mixed signals for a time duration which is programmed by the baseband processor 104. The accumulated M×N in-phase code mixed signals and accumulated M×N quadrature-phase code mixed signals are used for non-coherent integration. Programmable non-coherent integration comprises detecting envelope values of the accumulated M×N in-phase code mixed signals and the accumulated M×N quadrature-phase code mixed signals, and accumulating the envelope values for a time duration programmed by the baseband processor 104. The baseband processor 104 also aligns the beginning of the coherent integration with the data boundary prior to the coherent integration, i.e., the baseband processor 104 delays the beginning of the accumulation of the M×N in-phase code mixed signals and the M×N quadrature-phase code mixed signals for coherent integration, thereby aligning the beginning of coherent integration with data boundary from the received sampled received first satellite signal.

The satellite signal acquisition module 102 also comprises a peak detector 102e for detecting the peak among M×N non-coherent integration values. The sampled received first satellite signal is acquired based on the detected peak. A high peak value is obtained if the received first satellite signal is the same as the programmed satellite signal and the received first satellite signal is then acquired. The satellite signal acquisition module 102 is sequentially processed at a rate of $Pxf_S$ for acquiring P satellite signals, where P is any positive integer and $f_S$ is sampling frequency used for sampling the down converted first satellite signal.

The GNSS baseband chip 100 further comprises a feedback mechanism 206 for providing feedback to the satellite signal acquisition module 102. The feedback mechanism 206 comprises a sequential chip correlation array (SCCA) controller 205 and a communication interface 204 between the SCCA controller 205 and the baseband processor 104. The SCCA controller 205 receives the code phase offset, the code frequency and the code chip offset from the baseband processor 104 through the communication interface 204 for programming the first carrier and code generator 201a. The SCCA controller 205 also receives parameters for programming the selective signal selector 102b for selecting the accumulated in-phase carrier mixed signal, the accumulated quadrature-phase carrier mixed signal, and the N code bit sequences from one of the M signal generators 201. The selective signal selector 102b then forwards the selected in-phase carrier mixed signal, the selected quadrature-phase carrier mixed signal, and the selected N code sequences to the sequential code mixer 102c.

The GNSS baseband chip 100 further comprises a tracking module 103 for tracking a second satellite signal. The second satellite signal can be either the first satellite signal acquired by the satellite signal acquisition module 102, or a satellite signal specifically programmed for tracking. The tracking module 103 comprises a second carrier and code generator 103a for generating an in-phase component of a second carrier signal, a quadrature-phase component of the second carrier signal, and a code sequence corresponding to the second satellite signal.

The tracking module 103 also comprises a carrier and code mixer 103b, a coherent integrator 103c, and a non-coherent integrator 103d. The carrier and code mixer 103b multiplies the in-phase component of the second carrier signal with down converted and sampled second satellite signal, resulting in a carrier mixed in-phase component. The carrier and code mixer 103b also multiplies the quadrature-phase component of the second carrier signal with the down converted and sampled second satellite signal, resulting in a carrier mixed quadrature-phase component. Furthermore, the carrier and code mixer 103b performs code mixing operation of the carrier mixed in-phase component with the generated code sequence and the carrier mixed quadrature-phase component with the generated code sequence, resulting in a carrier and code mixed in-phase component and a carrier and code mixed quadrature-phase component. The code mixing operation involves multiplying the carrier mixed in-phase component with the generated code sequence and multiplying the carrier mixed quadature-phase component with the generated code sequence. The carrier and code mixed in-phase component and the carrier and code mixed quadrature-phase component are referred to as correlation values. The coherent integrator 103c generates coherent integration data and the non-coherent integrator 103d generates envelope data of the carrier and code mixed in-phase component and the carrier and code mixed quadrature-phase component. Generation of coherent integration data comprises accumulation of the carrier and code mixed in-phase component and the carrier and code mixed quadrature-phase component by the coherent integrator 103c for a first time duration programmed by the baseband processor 104.

Generating the envelope data by the non-coherent integrator 103d comprises accepting and storing the coherent integration data for a second time duration, for example, 1 millisecond in a memory (not shown). As disclosed above, coherent integration data comprises the carrier and code mixed in-phase component and the carrier and code mixed quadrature-phase component accumulated for the first time duration. After storing R coherent integration data values, a summation of the stored R coherent integration data values is obtained, where R is any positive integer. The envelope of the summation is determined and stored in the memory. The $(R+1)^{th}$ millisecond is stored as an index for determining the next envelope. This process is repeated to obtain S envelopes, where S is any positive integer.

Consider an example where the non-coherent integrator 103d accepts and stores 1-millisecond carrier and code mixed in-phase components and the carrier and code mixed quadrature-phase components into a memory (not shown). Once 20 1-millisecond carrier and code mixed in-phase components and the carrier and code mixed quadrature-phase components are stored in the memory, summation of the 20 1-millisecond carrier and code mixed in-phase components and the carrier and code mixed quadrature-phase components is obtained and the envelope is determined and stored in the memory. From the $21^{st}$ millisecond, the operation of summing 20 consecutive carrier and code mixed in-phase components and carrier and code mixed quadrature-phase components, and determining the envelope is continued for every next millisecond. The resultant envelopes are stored in the memory using the millisecond as the index. From the S envelopes obtained, a maximum envelope, a second maximum envelope and a minimum envelope of the S envelops are determined. The maximum envelope, the second maximum envelope, and the minimum envelope and their corresponding millisecond indexes stored in the memory are sent to the baseband processor 104 for further processing by a phase computation logic circuit 103f. The maximum envelope, the second maximum envelope, and the minimum envelope and their corresponding millisecond indexes stored in the memory are, for example, sent to the baseband processor 104 over 10 millisecond interrupt. These millisecond indexes indicate the data boundary detection data.

The tracking module 103 further comprises a data boundary synchronizer 103e for generating data boundary detection data using the coherent integration data from the tracking module 103. The data boundary synchronizer 103e transfers the generated data boundary detection data to a baseband processor 104 for further processing. The baseband processor 104 controls the tracking module 103 using the coherent integration data and the envelope data. The baseband processor 104 also aligns the beginning of the coherent integration with the data boundary prior to the coherent integration of the carrier and code mixed in-phase component and the carrier and code mixed quadrature-phase component.

The GNSS baseband chip 100 further comprises a phase computation logic circuit 103f for enabling a low interrupt rate to the baseband processor 104. The phase computation logic circuit 103f, for example, enables the sending of the correlation values, the code phase offset, the code frequency, the code chip offset, and data boundary detection data at a low interrupt rate to the baseband processor 104. As disclosed above, the data boundary detection data comprises the maximum envelope, the second maximum envelope, and the minimum envelope and their corresponding millisecond indexes stored in the memory. The phase computation logic circuit 103f computes arc tangent phase values from the coherent integration data. Furthermore, the phase computation logic circuit 103f sends the arc tangent phase values along with the correlation values, the code phase offset, the code frequency, the code chip offset, and data boundary detection data to the baseband processor 104 at a low interrupt rate, for example, 10 milliseconds, thereby enabling the baseband processor 104 to execute continuously for longer time durations. The computed arc tangent phase values are further processed by the baseband processor 104. The tracking module 103 is processed at a rate of $Q \times f_S$ for tracking Q satellite signals.

Figure 3:
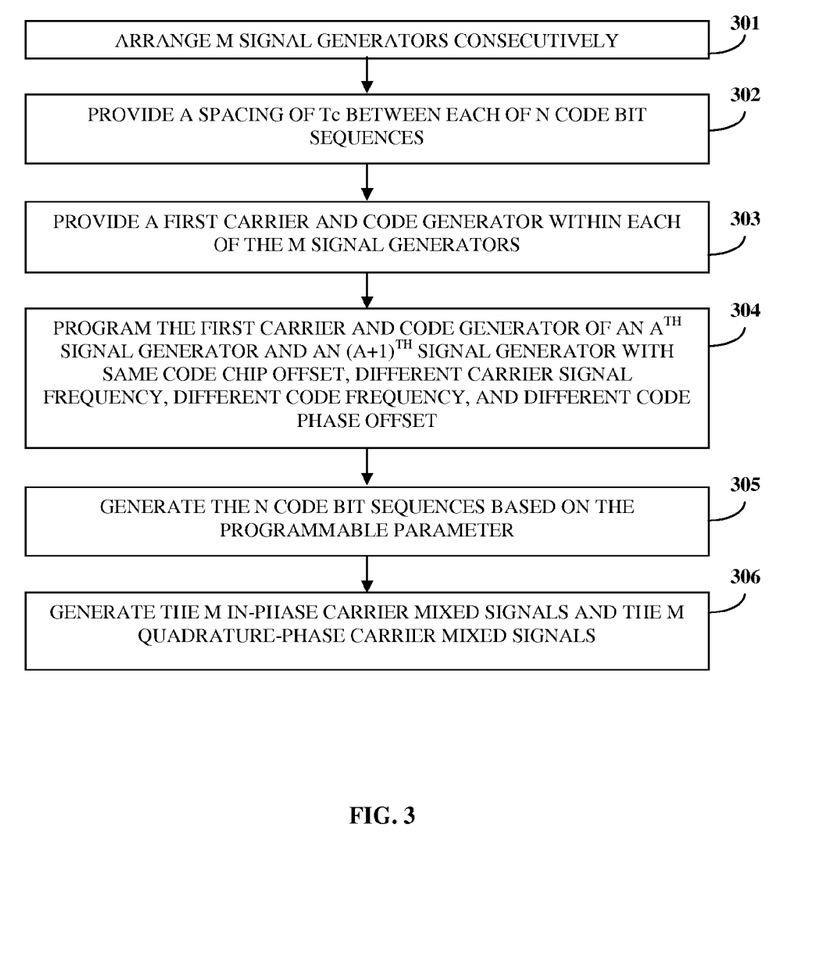
FIG. 3 illustrates a method of arranging M signal generators in a GNSS baseband chip for obtaining a sequential chip correlation array for generating M×N code bit sequences, M in-phase carrier mixed signals and M quadrature-phase carrier mixed signals.

FIG. 3 illustrates a method of arranging M signal generators 201 in a GNSS baseband chip 100 for obtaining a sequential chip correlation array 102a for generating M×N code bit sequences, M in-phase carrier mixed signals and M quadrature-phase carrier mixed signals. First, M signal generators 201 are arranged consecutively 301, where M and N are positive integers. A programmable parameter for providing a spacing of $T_C$ between each of the N code bit sequences is created 302, where $T_C$ is the width of a single code chip. A first carrier and code generator 201a is provided 303 within each of the M signal generators 201 for generating an in-phase component of a first carrier signal, a quadrature-phase component of the first carrier signal, and the N code bit sequences. A first carrier and code generator 201a of an $A^{th}$ signal generator 201 and a first carrier and code generator 201a of an $(A+1)^{th}$ signal generator 201 of the M signal generators 201 are programmed 304 with same code chip offset, different carrier signal frequency, different code frequency, and different code phase offset, wherein A is a positive integer and A<M. The N code bit sequences are generated 305 by each of the M signal generators 201 based on the programmable parameter. The N code bit sequences are generated by incrementally shifting a locally generated code sequence by $T_C$, using a shift register 201b. The M in-phase carrier mixed signals and the M quadrature-phase carrier mixed signals are generated 306 by mixing the in-phase component of the carrier signal and the quadrature phase component of the carrier signal with the down converted and sampled incoming satellite signal in each of the M signal generators 201.

Figure 4:
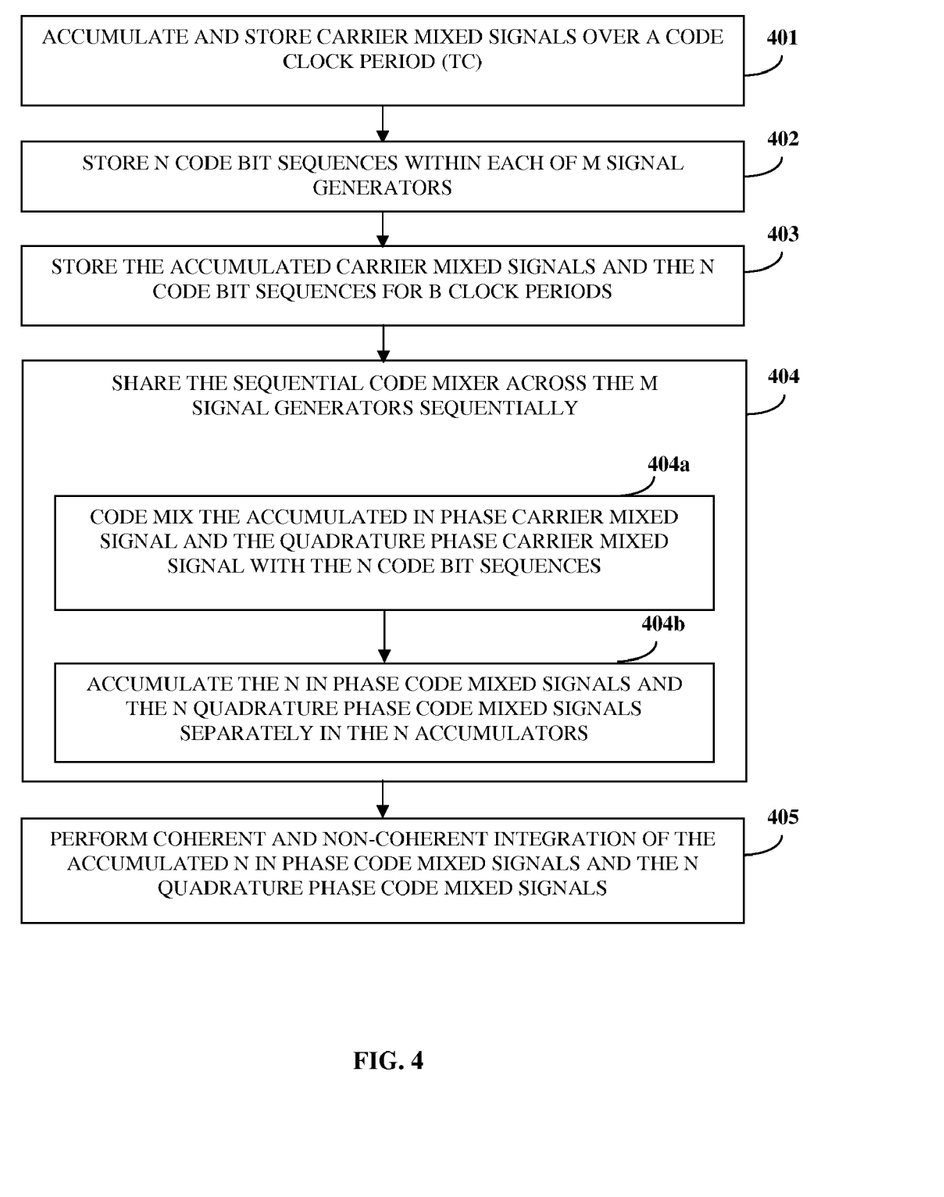
FIG. 4 illustrates a method of sharing a sequential code mixer comprising N multipliers and N accumulators sequentially across M signal generators.

FIG. 4 illustrates a method of sharing a sequential code mixer 102c comprising N multipliers 202 and N accumulators 203 sequentially across M signal generators 201. The method comprises accumulating and storing 401 carrier mixed signals over a period of code clock ($T_C$) within each of the M signal generators 201. The carrier mixed signals comprise a down converted and sampled first satellite signal multiplied with an in-phase component of a first carrier signal and the down converted and sampled satellite signal multiplied with a quadrature-phase component of the carrier signal, where M and N are positive integers. The N code bit sequences are stored 402 within each of the M signal generators 201. The accumulated carrier mixed signals and the N code bit sequences are stored 403 for B clock periods, where B>M/($f_S/f_C$), and where $f_S$ is frequency of sampling of down converted and sampled satellite signal and $f_C$ is frequency of code bit sequence generated within the M signal generators 201. The sequential code mixer 102c is shared 404 across the M signal generators 201 sequentially. During the process of sharing the sequential code mixer 102c, first, the accumulated in phase carrier mixed signal and the quadrature phase carrier mixed signal are code mixed 404a with the N code bit sequences for obtaining N in-phase code mixed signals and N quadrature phase code mixed signals. Second, the N in-phase code mixed signals and the N quadrature phase code mixed signals are accumulated 404b separately in the N accumulators 203 for a predefined time period. Finally, coherent and non-coherent integration of the accumulated N in-phase code mixed signals and the N quadrature phase code mixed signals is performed 405.

Figure 5:
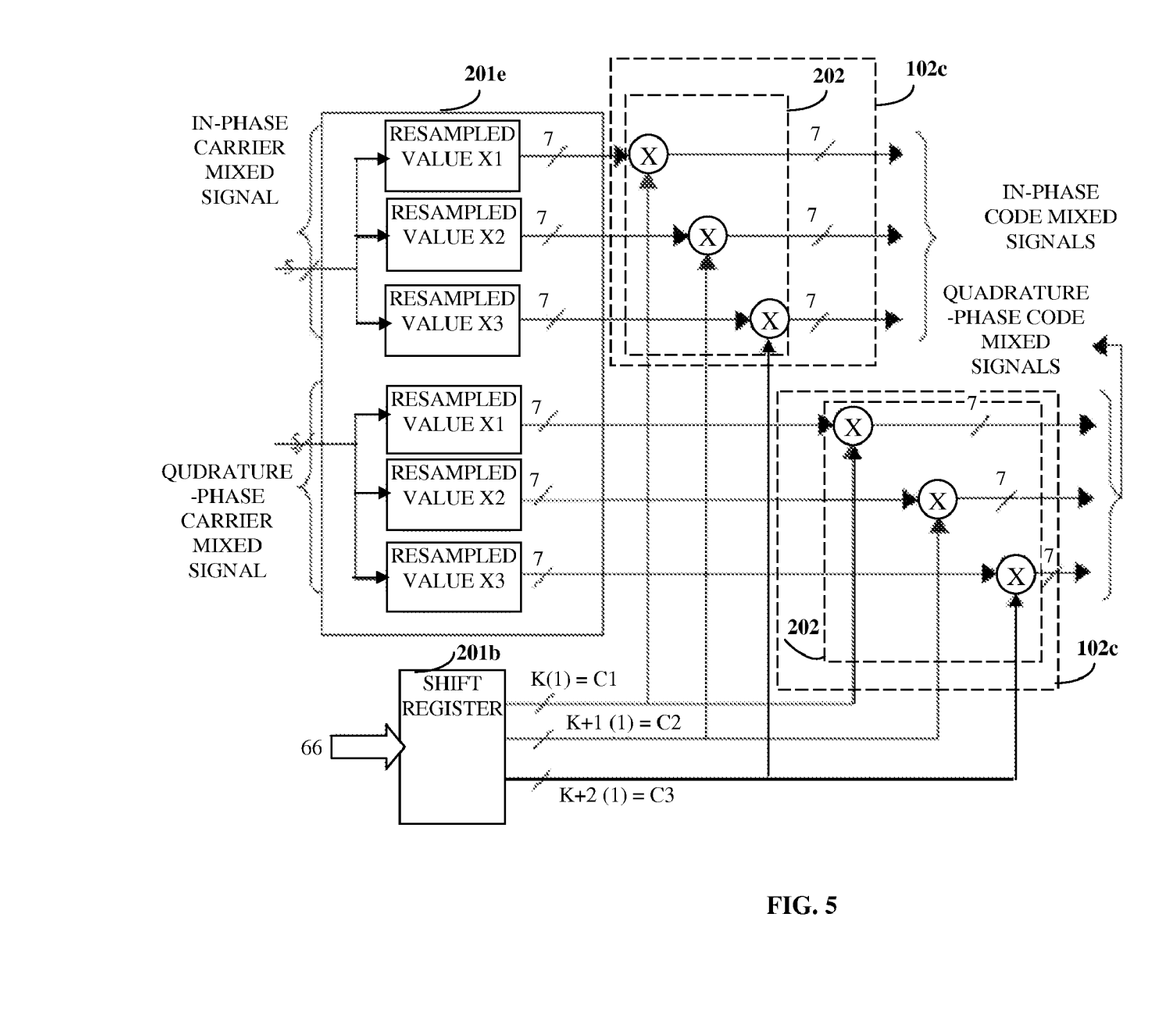
FIG. 5 illustrates code mixing operation performed for a single signal generator.

FIG. 5 illustrates a code mixing operation performed for a single signal generator 201 block output, wherein the locally generated code sequence is incrementally shifted by a single code chip width using a shift register 201b. X1, X2, and X3 represent the accumulated in-phase carrier mixed signal, or the accumulated quadrature-phase carrier mixed signal. The accumulated in-phase carrier mixed signal represents the re-sampled in-phase carrier mixed signal because the in-phase carrier mixed signal which is a product of an in-phase component of a first carrier signal and a sampled and down-converted first satellite signal, represents a sampled signal in a first format. Accumulating the sampled signal in the first format manipulates the sampled signal in the first format before it is stored back in the accumulator 201f in a second format. Similarly, the accumulated quadrature-phase carrier mixed signal represents re-sampled quadrature-phase carrier mixed signal. C1, C2, C3 represent incrementally shifted code bit sequences. The operation performed by code mixing is: X1*C1+X2*C2+X3*C3. The code mixing operation results in in-phase and quadrature-phase code mixed signals. Each of the N multipliers 202 in the sequential code mixer 102c changes the sign of in-phase and quadrature-phase code mixed signals based on the code bit sequence. If the code input value is 1, the sign of the in-phase and quadrature-phase code mixed signals is negated. If the code input value is not 1, the sign of the in-phase and quadrature-phase code mixed signals is retained. As a result of the above step of re-sampling of the in-phase carrier mixed signal and the quadrature-phase carrier mixed signal, the sequential code mixer 102c and the post correlation accumulator 102d are sequentially shared across the M signal generators 201. The sequential chip correlation array 102a arrangement and sequential processing of the M signal generator 201 outputs together minimize overall hardware required to achieve the best TTFF performance.

Figure 6:
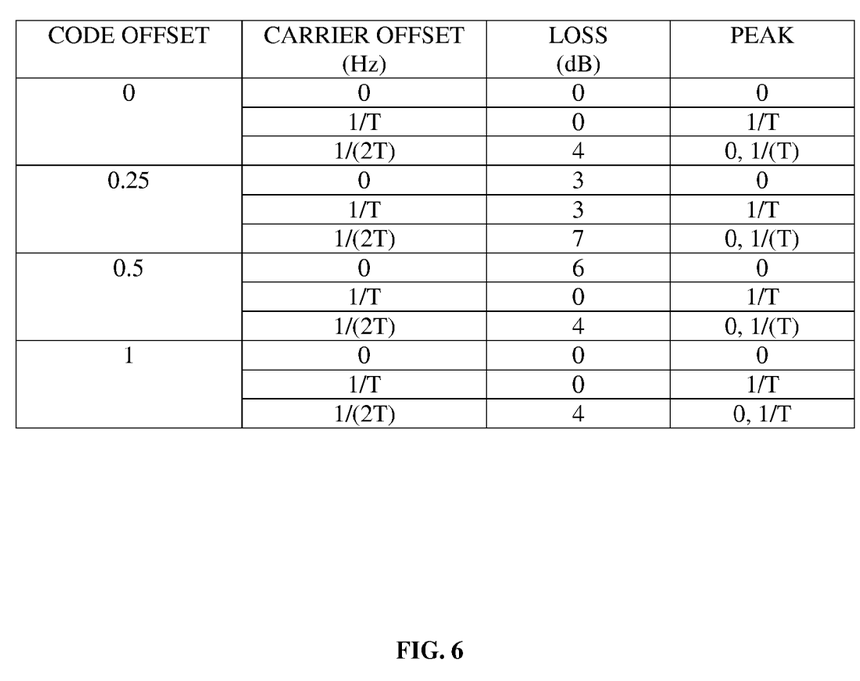
FIG. 6 illustrates loss due to arrangement of sequential chip correlation array as M programmable signal generators with output of each signal generator capable of performing correlation over multiple correlation time shifts and comprising multiple taps with chip spacing of $T_C$ between two adjacent code bit sequences.

FIG. 6 illustrates loss due to arrangement of the sequential chip correlation array 102a as M programmable signal generators 201 with output of each signal generator 201 capable of performing correlation over multiple correlation time shifts and comprising multiple taps with chip spacing of $T_C$ between two adjacent code bit sequences Each of the M signal generators 201 facilitate correlation over multiple correlation time shifts and generate different carrier frequency and different code phase. This sequential chip correlation array 102a requires half the number of correlation components to achieve the same TTFF, thereby reducing the die size and power consumption.

Considering coherent integration of "T" seconds for searching a first satellite, with frequency ambiguity of F and with Doppler step size of 1/T, with 1023 half chip searches, the number of cells to be searched by a single correlator to cover the Time-Frequency ambiguity will be [F/(1/T)]*1023*2. The time taken to search the ambiguity cells is [F/(1/T)]*1023*2*Tnon-coh. Tnon-coh is the non-coherent integration period, in seconds. Chip spacing of 0.5 $T_C$ and frequency step size of 1/T is expected to give a total loss of about 7 dB (3 dB due to code offset and 4 dB due to frequency offset). A massive parallel correlator of 2046 taps with half chip spacing will cover the ambiguity space in [F/(1/T)

*Tnon-coh] seconds. However, the arrangement with sequential chip correlation array 102a ensures the same result with half the number of correlation components. In this method, each signal generator 201 is capable of generating different carrier frequency and code phase. The N code bit sequences generated by each signal generator 201 is spaced at $T_C$ instead of $T_C/2$. Consider programming the sequential chip correlation array 102a to achieve 2 banks of 512 correlations. Each bank is programmed with a carrier frequency of $1/T_C$ and the code offset of $0.5\ T_C$.

Figure 7:
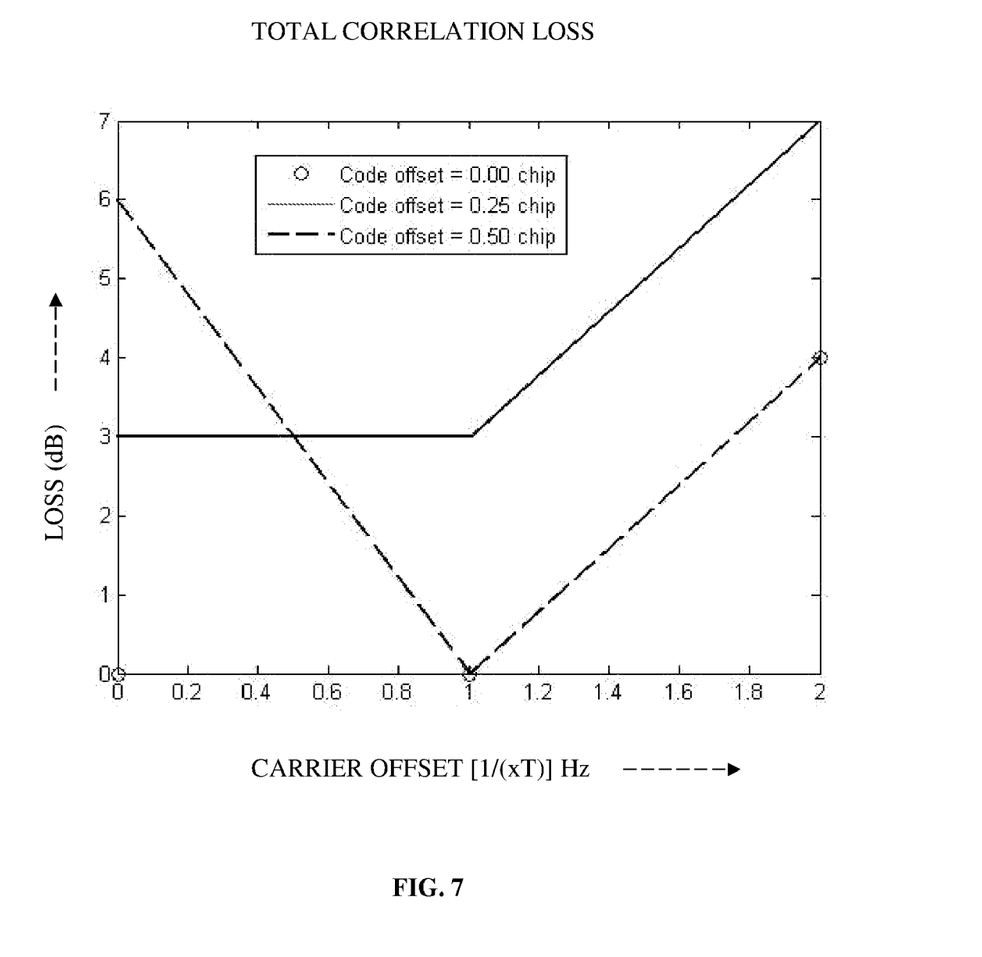
FIG. 7 illustrates total correlation loss due to sequential chip correlation array arrangement in a GNSS baseband chip.

FIG. 7 illustrates the total correlation loss due to sequential chip correlation array 102a arrangement in a GNSS baseband chip 100. As seen from FIG. 7, the total loss due to code phase and carrier frequency ambiguity is not more than about 7 dB with the sequential chip correlation array 102a arrangement. The search time required with sequential chip correlation array 102a is $[[F/(2/T)]*(1023/512)]$. Furthermore, the number of frequency searches is reduced by half as the banks are programmed with two different frequencies.

The number of correlation components required for a sequential chip correlation array 102a is half the number of correlation components required for a large parallel correlator. This reduction in requirement of the number of correlation components in the satellite signal acquisition module 102 significantly reduces the acquisition power consumed by the satellite signal acquisition module 102, wherein the satellite signal acquisition module 102 consumes maximum power compared to the tracking module 103, baseband processor 104, and RF down converter 101 for hand held GNSS chipsets.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A global navigation satellite system baseband chip comprising:
a satellite signal acquisition module configured to acquire a received first satellite signal, if said received first satellite signal is same as a programmed satellite signal, comprising:
a sequential chip correlation array comprising M signal generators, each of said M signal generators comprising:
a first carrier and code generator configured to generate an in-phase component of a first carrier signal, a quadrature-phase component of said first carrier signal, and N code bit sequences, wherein said first carrier and code generator generates said in-phase component and said quadrature-phase component of said first carrier signal with a programmed frequency, and said N code bit sequences with a programmed code phase offset, a programmed code frequency, and a programmed code chip offset, wherein M and N are positive integers; and
an accumulator configured to accumulate an in-phase carrier mixed signal and a quadrature-phase carrier mixed signal, wherein said in-phase carrier mixed signal and said quadrature-phase carrier mixed signal are obtained by multiplying said in-phase component of said first carrier signal and said quadrature-phase component of said first carrier signal with a down-converted and sampled received first satellite signal;
a selective signal selector that is programmable and configured to select said accumulated in-phase carrier mixed signal, said accumulated quadrature-phase carrier mixed signal, and said N code bit sequences from one of said M signal generators;
a sequential code mixer comprising N multipliers configured to perform simultaneous multiplication of said selected N code sequences with said selected in-phase carrier mixed signal and said selected N code sequences with said selected quadrature-phase carrier mixed signal, wherein said sequential code mixer further comprises N accumulators configured to accumulate N in-phase code mixed signals and N quadrature-phase code mixed signals, and wherein said sequential code mixer is sequentially shared across said M signal generators;
a post correlation accumulator configured to perform programmable coherent integration and programmable non-coherent integration of M×N in-phase code mixed signals and M×N quadrature-phase code mixed signals to obtain M×N non-coherent integration values; and
a peak detector configured to detect a peak among said M×N non-coherent integration values;
wherein said sampled received first satellite signal is acquired based on said detected peak, wherein said satellite signal acquisition module is sequentially processed at a rate of $P \times f_S$ for acquiring P programmable satellite signals, and wherein P is a positive integer and $f_S$ is sampling frequency used for said sampling of said down converted first satellite signal.

2. The global navigation satellite system baseband chip of claim 1, further comprising:
a tracking module that tracks a second satellite signal, comprising:
a second carrier and code generator that generates an in-phase component of a second carrier signal, a quadrature-phase component of said second carrier signal, and a code sequence corresponding to said second satellite signal;
a carrier and code mixer, a coherent integrator, and a non-coherent integrator, wherein said coherent integrator generates coherent integration data of a carrier and code mixed in-phase component and a carrier and code mixed quadrature-phase component, and wherein said non-coherent integrator generates envelope data from said coherent integration data;
a data boundary synchronizer that generates data boundary detection data using said coherent integration data, wherein said data boundary synchronizer transfers said generated data boundary detection data to a baseband processor for further processing, wherein said baseband processor controls said tracking module using said coherent integration data and said envelope data, and wherein said baseband processor aligns said coherent integration data with said data boundary prior to said coherent integration of said carrier and code mixed in-phase component and said carrier and code mixed quadrature-phase component; and a phase computation logic circuit for enabling a low interrupt rate to said baseband processor, wherein said phase computation logic circuit computes arc tangent phase values from one or more coherent integration data, and wherein said computed arc tangent phase values are sent to said baseband processor for further processing;

wherein said tracking module is processed at a rate of $Q \times f_S$ for tracking Q satellite signals.

3. The global navigation satellite system baseband chip of claim 2, further comprising a feedback mechanism for providing a feedback to said satellite signal acquisition module.

4. The global navigation satellite system baseband chip of claim 3, wherein said feedback mechanism comprises:
- a sequential chip correlation array controller; and
- a communication interface between said sequential chip correlation array controller and said baseband processor.

5. The global navigation satellite system baseband chip of claim 4, wherein said sequential chip correlation array controller receives said code phase offset, said code frequency, and said code chip offset from said baseband processor through said communication interface for programming said first carrier and code generator in each of said M signal generators, and wherein said sequential chip correlation array controller receives parameters for programming said selective signal selector for selecting said accumulated in-phase carrier mixed signal, said accumulated quadrature-phase carrier mixed signal, and said N code bit sequences from one of said M signal generators.

6. The global navigation satellite system baseband chip of claim 1, wherein said first carrier and code generator in each of said M signal generators comprises:
- a carrier generator for generating said first carrier signal; a code generator for generating a local code bit sequence; and
- a shift register for generating said N code bit sequences by incrementally shifting a locally generated code bit sequence by $T_C$, wherein $T_C$ is a single code clock period, and wherein said locally generated code bit sequence corresponds to said programmed satellite signal.

7. The global navigation satellite signal baseband chip of claim 1, wherein each of said M signal generators further comprises a carrier mixer for mixing said in-phase carrier mixed signal and said quadrature-phase carrier mixed signal.

8. A method of sharing a sequential code mixer comprising N multipliers and N accumulators sequentially across M signal generators, comprising:
- accumulating and storing carrier mixed signals over a code clock period within each of said M signal generators, wherein said carrier mixed signals comprise a down converted and sampled satellite signal multiplied with an in-phase component of a carrier signal and said down converted and sampled satellite signal multiplied with a quadrature phase component of said carrier signal, wherein M and N are positive integers;
- storing N code bit sequences within each of said M signal generators;
- storing said accumulated carrier mixed signals and said N code bit sequences for B clock periods, where $B > M/(f_S/f_C)$, wherein $f_S$ is frequency of sampling of said down converted satellite signal and $f_C$ is frequency of code bit sequence generated within said M signal generators;
- sharing said sequential code mixer across said M signal generators sequentially, by performing, for each of said M signal generators:
  - code mixing said accumulated in phase carrier mixed signal and said accumulated quadrature phase carrier mixed signal with said N code bit sequences for obtaining N in phase code mixed signal and N quadrature phase code mixed signals; and
  - accumulating said N in phase code mixed signals and said N quadrature phase code mixed signals separately in said N accumulators for a predefined time period;
- performing coherent and non-coherent integration of said accumulated N in phase code mixed signals and said N quadrature phase code mixed signals from said M signal generators.

* * * * *